M. ROSENKRANZ.
COOLING TABLE.
APPLICATION FILED AUG. 3, 1920.

1,407,169.

Patented Feb. 21, 1922.
2 SHEETS—SHEET 1.

Witnesses:
Edwin Trueb

Inventor:
Max Rosenkranz
by D. Anthony Usina
Attorney

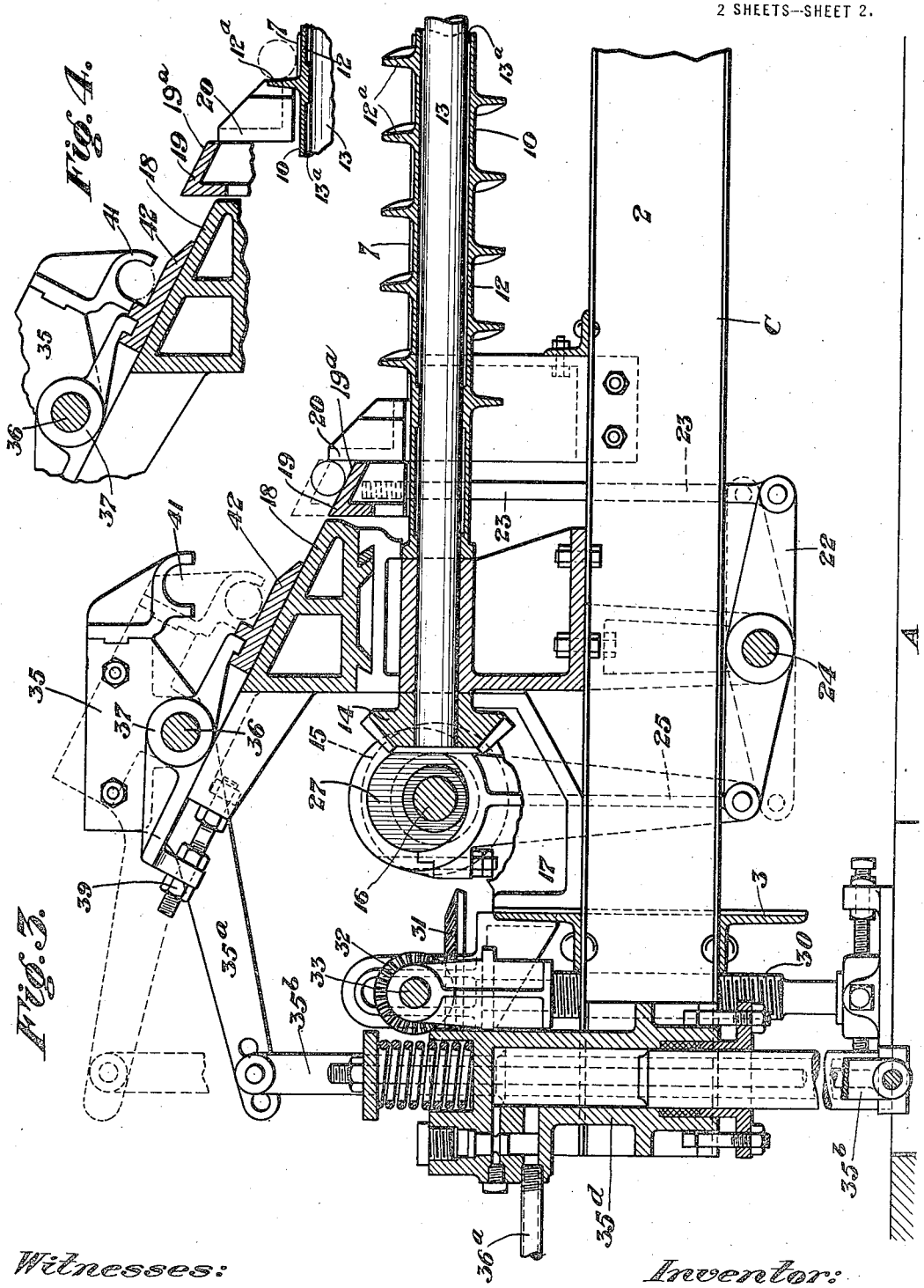

UNITED STATES PATENT OFFICE.

MAX ROSENKRANZ, OF PITTSBURGH, PENNSYLVANIA, ASSIGNOR TO NATIONAL TUBE COMPANY, OF PITTSBURGH, PENNSYLVANIA, A CORPORATION OF NEW JERSEY.

COOLING TABLE.

1,407,169.     Specification of Letters Patent.     Patented Feb. 21, 1922.

Application filed August 3, 1920. Serial No. 401,043.

*To all whom it may concern:*

Be it known that I, MAX ROSENKRANZ, a citizen of the United States, and resident of Pittsburgh, in the county of Allegheny and State of Pennsylvania, have invented certain new and useful Improvements in Cooling Tables, of which the following is a specification.

This invention relates to cooling tables or beds used in handling and conveying heated pipes and tubes, round metal bars and similar metal products while being cooled, after completion of the welding, rolling, or other shaping operations.

One object of my invention is the provision of a cooling table of improved construction and having novel means whereby the heated materials are delivered sidewise to the cooling table, are conveyed transversely of their length across the width of the cooling table during the pipe or tube cooling operation, and are discharged from the cooling table into a collecting cradle in a heap or pile, in readiness to be removed in bulk from the cradle.

Another object of the invention is to provide a cooling table having novel means whereby the materials being cooled are supported and caused to rotate in traversing the width of the cooling bed.

Another object of the invention is to provide a cooling table having novel means for supporting the cooling table and for alining the cooling table and associated mechanism relative to the sizing or reducing rolls or passes in these rolls.

A further object of the invention is to provide a cooling table having novel means for receiving the pipes or tubes from the conveying trough and for automatically delivering the pipes or tubes upon the cooling table at predetermined intervals in the operation of the cooling table.

A further object of this invention is to provide a cooling table having improved means whereby overheating and warping of the parts of the cooling table are overcome and prevented.

A still further object of the invention is to provide a cooling table having a conveying trough and lifting trough cover mounted thereon, and having novel means whereby the trough and trough cover are adjusted with and relative to the cooling table in alining the trough and trough cover with the passes of the sizing rolls.

A still further object of my invention is the provision of a cooling table and associated mechanism having the novel constructions, arrangements and combination of parts fully described hereinafter and pointed out in the appended claims and illustrated in the accompanying drawings, in which—

Figure 3 is a sectional end elevation of the receiving side of the table, on a larger scale, showing details in the construction of the novel trough and trough cover and the improved trough adjusting mechanism forming part of my invention.

Figure 4 is a sectional end elevation of the receiving side of the cooling table, showing further details in the construction of the trough and trough cover forming part of this invention.

Figure 1:
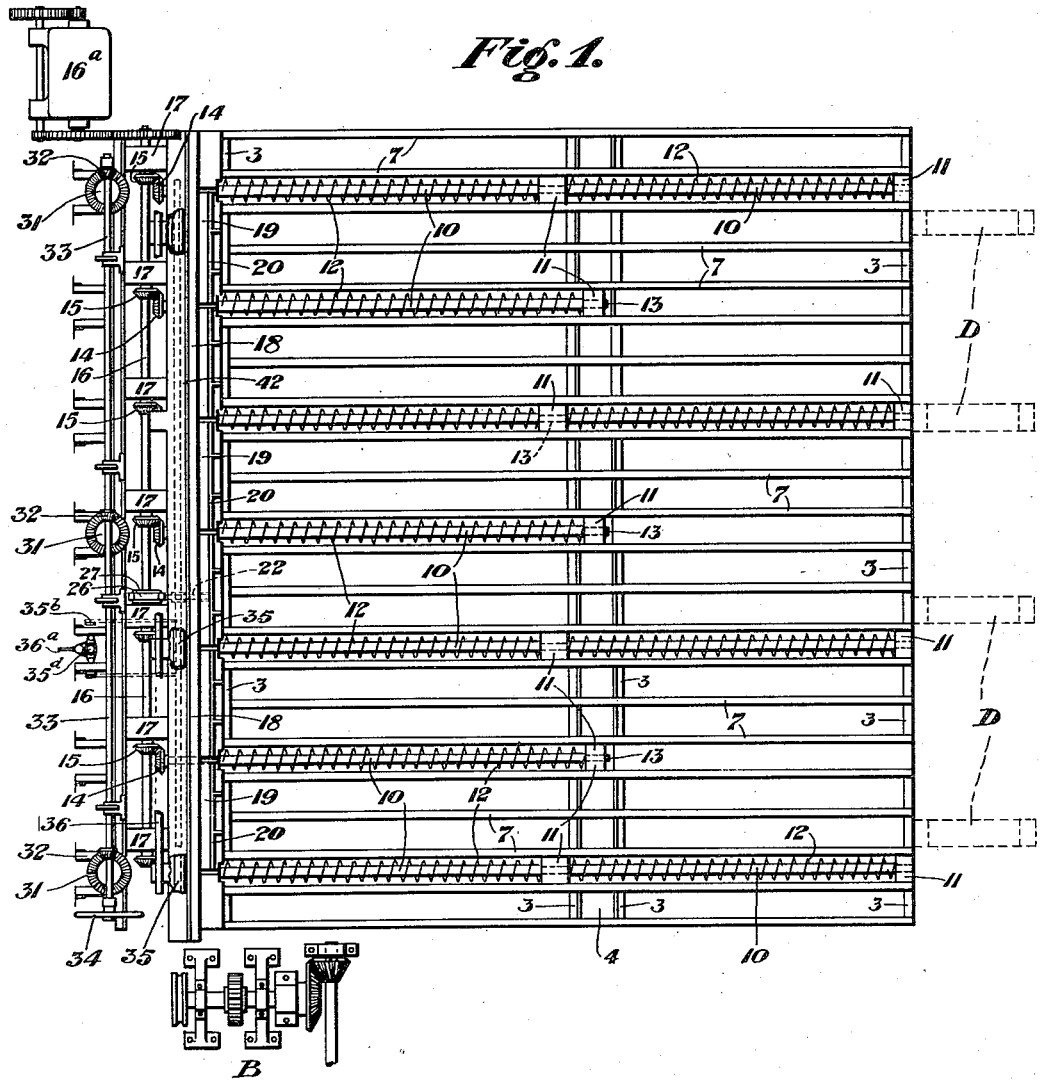
Figure 1 is a plan showing a cooling table constructed and arranged in accordance with my invention, the major portion of the trough cover at one side of the table being omitted for the sake of clearness.
Figure 2:
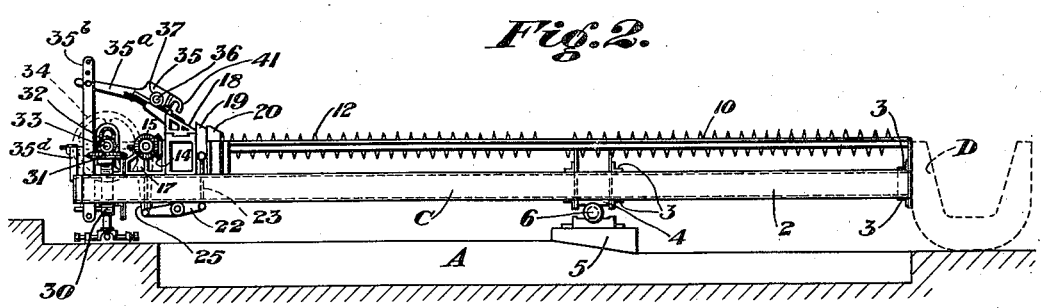
Figure 2 is an end elevation of the cooling table of Figure 1, showing the centrally arranged roller support and rear end adjusting mechanism.

In the accompanying drawings my improved cooling table is shown supported in a pit A, and located adjacent to the exit side of the pipe sizing rolls B. The cooling table has a frame C formed of a series of crossbeams 2 which are secured together at their ends and at intermediate points by longitudinally extending angles 3. A top bearing 4 is provided for each beam 2 at approximately the center of the length thereof. Bottom bearings 5 mounted in the pit A are positioned below the bearings 4, and an anti-friction roller 6 supported between each pair 4 and 5 of the bearings so as to form a pivoted support for the cooling table that permits of tilting and free expansion and contraction of the table parts without distorting the cooling table.

Transverse rails or skid members 7 are provided at suitable intervals in the length of the cooling table which extend from one side to the other of the table, and on which the pipes or tubes are supported while being conveyed from the receiving side to the delivery side of the cooling table.

Screw conveyers 10 and 10<sup>a</sup> are journaled in suitable bearings 11 mounted between certain pairs of the rails or skids are provided to positively move the pipes or tubes across the width of the cooling table. The conveyers 10<sup>a</sup> terminate at approximately the middle of the width of the cooling table, since the pipes or tubes become cooled sufficiently by the time they reach that point as to not readily distort or bend. The screw conveyers 10 and 10<sup>a</sup> are secured on shafts 13 which extend through their hollow shank portions 12. Each of the conveyers have a helical wing 12<sup>a</sup> integrally formed thereon, these wings engaging with and positively moving the pipes or tubes on the skids 7 when the screw conveyers are rotated.

The conveyers 10 and 10<sup>a</sup> are mounted in the bearings 11 to maintain the shank portions 12 slightly below the top surface of the skids 7, (see Figure 3) so as to avoid and prevent any of the weight of the materials being conveyed from being carried by the conveyers.

The beams 2 extend beyond the ends of the rails or skids 7 at the receiving side of the cooling table and form a support for the dumping conveyer trough 18, its associated parts, and the driving mechanism for the screw conveyers 10 and 10<sup>a</sup>.

One end of the shaft 13 of each of the conveyers 10 and 10<sup>a</sup> extends past the bearing blocks 11 at the receiving side of the table, and has a bevel gear 14 secured thereon, the gears 14 being in mesh with driving bevel gears 15 mounted on the drive shaft 16 which is journaled in the bracket bearings 17 mounted on the frame C. The shaft 16 is driven through suitable reducing gears by the motor 16<sup>a</sup> located at one corner of the cooling table, so that the conveyers will turn in unison when the shaft 16 is driven by the motor.

The dumping conveyer trough 18, as has been said, is mounted on the beams 2 at the receiving side of the cooling table, and positioned in front of the trough 18 is a vertically movable stop or barrier 19, and in front of the movable barrier 19 is a stationary stop or barrier 20. The movable barrier 19 has a sloping top face 19<sup>a</sup> which, when in its lowermost position, forms a continuation of the sloping upper face of the trough 18. When in its uppermost position the inclined upper face of the movable barrier is in the same inclined plane as the inclined face of the stationary barrier 20. (See Figures 3 and 4).

The stationary barrier 20 extends alongside the table in a vertical plane, parallel to the plane of the receiving ends of the wings 12<sup>a</sup> of the series of screw conveyers 12, and also has a downwardly sloping face so that pipe may travel downwardly by gravity from the trough 18 upon the barrier 19 and against the fixed barrier 20 and be lifted up to the top of the fixed barrier 20 so as to then roll by gravity upon the skids 7 and into engagement with the series of screw conveyers 10 and 10<sup>a</sup>.

The lifting barrier 19 is operated by means of a series of connecting rods 23 connected to one end of levers 22. The levers 22 are mounted on a shaft 24 and are rocked by eccentric rods 25 and eccentrics 27. The eccentrics 27 are keyed or otherwise fastened at intervals in its length to the drive shaft 16 by which they are actuated in unison. The levers 22, when found necessary or desirable, will have counterweights on one end to counterbalance the moving parts and cause the apparatus to operate smoothly under load.

The screw conveyers 10 and 10<sup>a</sup> and movable barrier 19 are driven by the same shaft 16 in timed relation so that at each complete revolution of the conveyers the barrier 19 will have lifted to its highest or discharge point, (that shown in Figure 4) so as to deliver a pipe into engagement with the receiving end of the screw conveyers 10 and 10<sup>a</sup>.

The cooling table and associated pipe dumping mechanism is arranged to tilt on the support formed by the bearings 4 and 5 and anti-friction roller 6, in adjusting the dumping trough and trough cover to keep it in alinement with the grooves in the sizing rolls B. In order to make the necessary adjustments of the tilting table, a series of vertical adjusting screws 30 are positioned at the receiving side of the cooling table. These screws have bevel gears 31 on their upper ends which mesh with bevel pinions 32 on the horizontal shaft 33, the shaft 33 being arranged to be operated by a handwheel 34 at one end of the shaft. Having the screw adjusting shaft 33 geared to each one of the series of adjusting screws 30 enables all of the screws to turn simultaneously, and not only saves time and labor, but insures a more accurate adjustment.

A trough cover 35 having an operating lever 35<sup>a</sup> at one side thereof is pivotally mounted on a shaft 36, and this shaft is journaled in bearings 37. The bearings 37 are adjustably secured on the trough 18, being adjusted and held in adjusted position thereon by the bolts 39.

The forward end of the trough cover 35 is hollowed out to form a tunnel 41 in which the pipes or tubes travel when being delivered lengthwise from the sizing rolls into position opposite the cooling table. The lever 35<sup>a</sup> is adapted to be operated by the piston 35<sup>b</sup> in the fluid pressure cylinder 35<sup>d</sup> when fluid pressure is admitted through the pipe 36<sup>a</sup> either by means of automatically operated mechanism (not shown), or by means of a valve operated by hand.

In the particular construction shown, a renewable wear plate 42 is provided on top of the trough 18, this wear plate being detachably fastened to the adjustable bearings 37 and extending forwardly beyond the side of the tunnel 41 in the cover 35. While this wear plate preferably will be used, it is obvious that it may be omitted when found desirable. The usual cradles D are provided at the delivery side of the hot bed for receiving and collecting the pipes in a pile so that the pile of pipes may be removed readily by any suitable means, such as an overhead traveling crane.

The operation of the apparatus shown in the drawings, is as follows—

The cooling table, after being erected in the pit A, and after the sizing rolls B have been set, is tilted by turning the hand-wheel 34 and thereby rotating the adjusting screws 30 so as to adjust the trough 18, trough cover 35, and receiving side of the cooling table vertically. The trough cover 35 is then adjusted across the width of the trough 18 by turning the nuts on the bolts 39 until the tunnel 41 alines with the pass or one of the passes in the sizing rolls B.

By raising and lowering the receiving side of the cooling table vertically, and by adjusting the trough cover 35 across the width of the trough 18, the axial center of the tunnel 41 when the trough cover 35 is in closed position (shown in Figure 4) is brought into alinement with the axis of the pass, or, when more than one pass is provided, with the desired pass in the sizing rolls B. By adjusting the trough cover and cooling bed in this manner also enables the tunnel 41 and passes in the sizing rolls to be in alinement with pipes of varying sizes.

After making the proper adjustments in the manner just described, the apparatus is in readiness for use. Power is then communicated to the conveyer shaft 16 by the motor 16a and the apparatus is thereby set in motion.

The trough cover 35 being in the position shown in Figure 4, the pipe passes from the sizing rolls B into the tunnel 41 and after a predetermined time, when the pipe will be clear of the rolls, the trough cover 35 is automatically raised. This is accomplished by the admission of fluid pressure to the cover lifting cylinder 35a, which causes the piston 35b to move outwardly and depress the lever 35a when the trough cover moves from the position shown in Figure 4 into that of Figure 3, the pipe is freed and it rolls or slides downwardly gainst the movable barrier 19. The movable barrier which is being operated by the drive shaft 16, through the rods 23, levers 22 and eccentric rods 25, automatically move downward into the position shown in full lines in Figure 3, and return so as to lift the pipe above the stationary barrier 20 from which the pipe falls or rolls upon the skids 7 into engagement with the wings 12a of the screw conveyers 10 and 10a.

The movable barrier and the conveyer screws 10 and 10a are operated from the same power shaft 16 in timed relation so that the wings 12a of the rotating conveyers will all be alined in position to receive a pipe when the movable barrier reaches its highest point and drops or discharges the pipe over the stationary barrier.

The pipes as received by the rotating screw conveyers 10 and 10a are moved transversely on the skids 7, and by the action of the wings 12a on the conveyers will be continuously rotated as they travel across the width of the cooling table. When the pipes reach the discharge side of the table they are delivered into the cradles D where they remain until a sufficient number is collected when the pile or heap is removed by a suitable overhead traveling crane. (Not shown).

The many advantages of my improved apparatus will be apparent to those skilled in the art.

The cooling tables when constructed in accordance with my invention, are readily adjusted to bring the dumping trough and its tilting cover into alinement with the passes of the sizing rolls without the necessity of providing shims or fillers in the space between the trough and table, as is necessary when the trough is adjustable relative to the stationary table.

The anti-friction pivot bearing for the table allows for contraction and expansion without warping and twisting of the table.

The novel trough and its associated barriers positively overcome the uneven delivery of pipes upon the screw conveyers and prevents the bending of the pipes as would result from crossing of the pipes on the conveyers.

The conveyers will convey the pipe and cause them to continuously rotate in traveling across the cooling table, so as to cause an even cooling action, and the use of sprocket chains for moving, which stretch and give and become broken, is avoided and made unnecessary.

As various modifications of my invention will readily suggest themselves to those skilled in the art, I do not wish to be limited to the precise structure shown and described, since it is only illustrative, to enable those skilled in the art to understand my invention, which is defined in the appended claims.

I claim:—

1. A cooling table, comprising a pivoted frame, means for tilting and holding said frame in tilted position, conveyer members on said frame, and a conveying trough secured to and forming an integral part of said frame.

2. A cooling table for pipe mills, comprising a frame, a conveyer trough carried on said frame, and a bearing adjacent to the longitudinal center line of said frame on which said frame is pivotally mounted.

3. A cooling table for pipe mills, comprising a frame, a roller bearing adjacent to the longitudinal center line of said frame on which said frame is pivotally mounted, and a conveying trough secured to and forming an integral part of said cooling table.

4. A cooling table comprising a pivotally mounted frame, conveyers on said table for moving pipes across the width of said frame, means at one side of said cooling table for tilting the table, and a conveying trough secured to and forming an integral part of said table.

5. A cooling table comprising, in combination, a frame, conveyers on said frame, and a conveying trough secured to and supported on said frame, said conveying trough comprising a trough bottom, a trough cover, a stationary barrier, and a movable barrier adapted to engage and lift materials over said stationary barrier to said conveyers.

6. A cooling table comprising a frame, skid members and conveyer members mounted on said frame, a pivotal support for said frame adjacent to the longitudinal center line thereof, means for vertically tilting the said frame in said bearing and conveying trough on the receiving side of said frame.

7. A cooling table comprising a frame, skid and conveyer members mounted on said frame, a roller support adjacent the longitudinal center line of said frame, means for vertically adjusting the frame on said support, and a conveying trough secured to and supported on one side of said frame, said conveying trough comprising a trough bottom and a trough cover, said cover member being adjustable transversely, relative to said trough bottom.

8. A cooling table comprising a frame, transversely extending skid members mounted on said frame, screw conveyers mounted on said frame, and a roller forming a pivotal support for said table adjacent the longitudinal center line of said table.

9. A cooling table comprising a table pivotally supported adjacent its longitudinal center line, screw conveyers on said table, means for adjusting the receiving side of said table vertically, and a conveyer trough secured to and supported on the receiving side of said table.

10. A cooling table comprising, in combination, a frame, conveyers on said frame, and a conveyer trough secured to and supported on said frame, said trough comprising a trough bottom, a cover for said bottom, a vertically movable barrier adapted to lift materials discharged from said trough, a stationary barrier adapted to engage and hold materials delivered from said trough, and means for automatically reciprocating said movable barrier to lift materials above said stationary barrier in delivering materials to said conveyers.

In testimony whereof, I have hereunto set my hand.

MAX ROSENKRANZ.